US011057145B2

(12) United States Patent
Gui et al.

(10) Patent No.: US 11,057,145 B2
(45) Date of Patent: Jul. 6, 2021

(54) WAVELENGTH-DIVISION MULTIPLEXING DEVICE WITH A UNIFIED PASSBAND

(71) Applicant: ALLIANCE FIBER OPTIC PRODUCTS, INC., Sunnyvale, CA (US)

(72) Inventors: Dong Gui, San Jose, CA (US); Yao Li, Newark, CA (US); Shudong Xiao, Fremont, CA (US); Andy Fenglei Zhou, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 17/028,090

(22) Filed: Sep. 22, 2020

(65) Prior Publication Data

US 2021/0006347 A1    Jan. 7, 2021

Related U.S. Application Data

(63) Continuation of application No. PCT/US2019/022235, filed on Mar. 14, 2019.

(Continued)

(51) Int. Cl.
*H04B 10/00* (2013.01)
*H04J 14/02* (2006.01)
*H04J 14/00* (2006.01)

(52) U.S. Cl.
CPC ...... *H04J 14/0267* (2013.01); *H04J 14/0239* (2013.01); *H04J 14/0278* (2013.01)

(58) Field of Classification Search
CPC ..... H04Q 2011/0009; H04Q 2011/0016; H04J 14/023; H04J 14/0232; H04J 14/0234;

(Continued)

(56) References Cited

U.S. PATENT DOCUMENTS 5,737,104 A     4/1998 Lee et al.
5,786,915 A  *  7/1998 Scobey ................. G02B 5/288
                                                          398/82

(Continued)

FOREIGN PATENT DOCUMENTS

KR    10-2014-0126635 A    10/2014

OTHER PUBLICATIONS

International Search Report and Written Opinion of the International Searching Authority; PCT/US2019/022235; dated June 7, 2019; 15 Pages; European Patent Office.

(Continued)

*Primary Examiner* — Daniel G Dobson
(74) *Attorney, Agent, or Firm* — Adam R. Weeks

(57) ABSTRACT

Disclosed herein is a wavelength-division multiplexing device with a unified passband. In particular, disclosed is a wavelength-division multiplexing (WDM) device with at least a common port, a channel port, and a WDM filter. The common port is configured for optical communication of a multiplexed signal to the WDM filter. A demultiplexed signal of the multiplexed signal includes a first secondary demultiplexed signal within a first wavelength range and a second secondary demultiplexed signal within a second wavelength range, which are separated from each other by a third wavelength range. The first WDM filter has a single unified passband including the first wavelength range, the second wavelength range, and the third wavelength range, such that the first WDM filter is configured to pass the first secondary demultiplexed signal and the second secondary demultiplexed signal to the first channel port.

9 Claims, 15 Drawing Sheets

Related U.S. Application Data

(60) Provisional application No. 62/649,721, filed on Mar. 29, 2018.

(58) Field of Classification Search
CPC .............. H04J 14/0239; H04J 14/0242; H04J 14/0245; H04J 14/0246; H04J 14/0247; H04J 14/0282
See application file for complete search history.

(56) References Cited

U.S. PATENT DOCUMENTS

| | | | |
|---|---|---|---|
| 6,008,920 A | 12/1999 | Hendrix | |
| 6,167,171 A | 12/2000 | Grasis et al. | |
| 7,092,587 B1 | 8/2006 | Denis | |
| 7,787,731 B2 | 8/2010 | Bookbinder et al. | |
| 7,843,644 B1 | 11/2010 | Wang et al. | |
| 8,908,281 B2 | 12/2014 | Fu | |
| 9,401,773 B1 | 7/2016 | Gui et al. | |
| 9,551,833 B1 | 1/2017 | Li et al. | |
| 9,590,759 B1 | 3/2017 | Peng et al. | |
| 2008/0166094 A1 | 7/2008 | Bookbinder et al. | |
| 2009/0169163 A1 | 7/2009 | Abbott et al. | |
| 2010/0329678 A1 | 12/2010 | Wang et al. | |
| 2014/0355987 A1* | 12/2014 | Zhu ..................... | H04B 10/572 398/58 |
| 2016/0187585 A1 | 6/2016 | Yue | |
| 2017/0261691 A1 | 9/2017 | Yue | |

OTHER PUBLICATIONS

Wang et al., "Compact CWDM: a low-cost high-performance packaging platform", Proceedings of Spie Medical Imaging, vol. 5729, Mar. 25, 2005, p. 285.

* cited by examiner

WAVELENGTH-DIVISION MULTIPLEXING DEVICE WITH A UNIFIED PASSBAND

PRIORITY APPLICATIONS

This application is a continuation of International Application No. PCT/US19/22235, filed on Mar. 14, 2019, which claims the benefit of priority to U.S. Application No. 62/649,721, filed on Mar. 29, 2018, both applications being incorporated herein by reference.

BACKGROUND

This disclosure relates to wavelength-division multiplexing and demultiplexing. Wavelength-division multiplexing (WDM) is a technology that multiplexes (e.g., adds) a number of distinct wavelengths of light onto a single optical fiber and demultiplexes (e.g., divides) a number of distinct wavelengths of light from a single optical fiber, thereby increasing information capacity and enabling bi-directional flow of signals. In one example, multiple optical signals are multiplexed with different wavelengths of light combined by a multiplexer at a transmitter, directed to a single fiber for transmission of the signal, and split by a demultiplexer to designated channels at a receiver. By combining multiple channels of light into a single channel, WDM devices and associated devices can be used as components in an optical network, such as a passive optical network (PON).

Many WDM devices rely upon WDM filters for routing demultiplexed signals between a common port and a plurality of channel ports. For particular applications (e.g., Next Generation Passive Optical Network 2 (NG-PON2) applications) one or more channel ports of a WDM device may be a multiband channel port for transmission of a demultiplexed signal with multiple discrete signal bands. A multiband WDM filter could be used to route a multiband demultiplexed signal between the multiband channel port and the common port.

In this regard, FIG. 1 is a diagram illustrating transmission spectra 100 for a multiband WDM filter of a WDM device. The transmission spectra 100 includes a first wavelength range 102 and a second wavelength range 104 separated from each other by a third wavelength range 106. The WDM filter is a multiband filter with a first passband 108 based on the first wavelength range 102 and a second passband 110 based on the second wavelength range 104. In other words, the WDM filter is a dual-band filter, able to transmit a multiband demultiplexed signal between a common port and a multiband channel port.

While a multiband filter provides for transmission of a multiband demultiplexed signal, multiband filters may be more difficult and expensive to fabricate compared to a single band filter.

No admission is made that any reference cited herein constitutes prior art. Applicant expressly reserves the right to challenge the accuracy and pertinency of any cited documents.

SUMMARY

Disclosed herein is a wavelength-division multiplexing device with a unified passband. In particular, disclosed is a wavelength-division multiplexing (WDM) device with at least a common port, a channel port, and a WDM filter. The common port is configured for optical communication of a multiplexed signal to the WDM filter. The multiplexed signal includes a primary demultiplexed signal which further includes a first secondary demultiplexed signal within a first wavelength range and a second secondary demultiplexed signal within a second wavelength range, which are separated from each other by a third wavelength range. The first WDM filter has a first single unified passband including the first wavelength range, the second wavelength range, and the third wavelength range, such that the first WDM filter is configured to pass the first secondary demultiplexed signal and the second secondary demultiplexed signal to the first channel port. In use, the first secondary demultiplexed signal and the second secondary demultiplexed signal may then be transmitted to a second WDM device having a second WDM filter to demultiplex the first secondary demultiplexed signal from the second secondary demultiplexed signal downstream. The first single unified passband of the first WDM device may simplify fabrication of the WDM device (e.g., the WDM filter) and may reduce costs compared with the use of one or more multiband WDM filters.

One embodiment of the disclosure relates to a wavelength-division multiplexing (WDM) device. The WDM device comprises a first common port, a first channel port, a second channel port, and a first WDM filter. The first common port is configured for optical communication of a first multiplexed signal comprising a first primary demultiplexed signal and a second primary demultiplexed signal. The first primary demultiplexed signal comprises a first secondary demultiplexed signal within a first wavelength range and a second secondary demultiplexed signal within a second wavelength range. The first wavelength range and the second wavelength range are separated from each other by a third wavelength range. The first channel port is configured for optical communication of the first primary demultiplexed signal. The second channel port is configured for optical communication of the second primary demultiplexed signal. The first WDM filter has a first single unified passband comprising the first wavelength range, the second wavelength range, and the third wavelength range. The first WDM filter is configured to pass the first secondary demultiplexed signal and the second secondary demultiplexed signal to the first channel port and to pass the second primary demultiplexed signal to the second channel port.

An additional embodiment of the disclosure relates to a method for wavelength-division multiplexing (WDM) routing. The method comprises transmitting a first multiplexed signal from a first common port. The first multiplexed signal comprises a first primary demultiplexed signal and a second primary demultiplexed signal. The first primary demultiplexed signal comprises a first secondary demultiplexed signal within a first wavelength range and a second secondary demultiplexed signal within a second wavelength range. The first wavelength range and the second wavelength range are separated from each other by a third wavelength range. The method further comprises routing the first primary demultiplexed signal to a first channel port by passing the first secondary demultiplexed signal and the second secondary demultiplexed signal through a first WDM filter having a first single unified passband comprising the first wavelength range, the second wavelength range, and the third wavelength range. The method further comprises routing the second primary demultiplexed signal to a second channel port by reflection of the first WDM filter.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
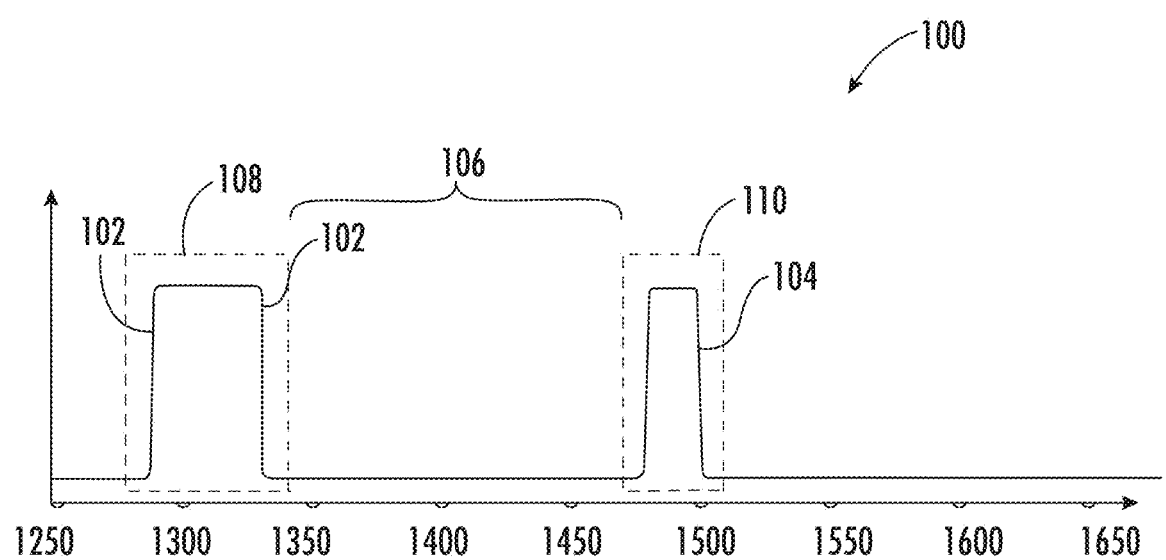
FIG. 1 is a diagram illustrating transmission spectra for a multiband WDM filter of a WDM device.

Reference will now be made in detail to the present preferred embodiments, examples of which are illustrated in the accompanying drawings. Whenever possible, the same reference numerals will be used throughout the drawings to refer to the same or like parts.

Terms such as "left," "right," "top," "bottom," "front," "back," "horizontal," "parallel," "perpendicular," "vertical," "lateral," "coplanar," and similar terms are used for convenience of describing the attached figures and are not intended to limit this description. For example, terms such as "left side" and "right side" are used with specific reference to the drawings as illustrated and the embodiments may be in other orientations in use. Further, as used herein, terms such as "horizontal," "parallel," "perpendicular," "vertical," "lateral," etc., include slight variations that may be present in working examples.

As used herein, the terms "optical communication," "in optical communication," and the like mean that two elements are arranged such that optical signals are passively or actively transmittable therebetween via a medium, such as, but not limited to, an optical fiber, free space, index-matching structure or gel, optical connector, optical splice, reflective surface, or other light directing or transmitting means.

As used herein, the term "port" means an interface for actively or passively passing (e.g., receiving, transmitting, or both receiving and transmitting) optical signals. A port may include, by way of non-limiting examples, one or more collimators, collimating lenses, pigtails, fiber optic connectors, optical splices, optical fibers, free-space, or a combination of one or more of the foregoing.

As used herein, the term "pigtail" means a one or more optical fibers that extend from a ferrule. The one or more optical fibers may each be terminated with a fiber optical connector but are not required to be terminated with a fiber optic connector.

Disclosed herein is a wavelength-division multiplexing device with a unified passband. In particular, disclosed is a wavelength-division multiplexing (WDM) device with at least a common port, a channel port, and a WDM filter. The common port is configured for optical communication of a multiplexed signal that includes a primary demultiplexed signal. The primary demultiplexed signal includes a first secondary demultiplexed signal within a first wavelength range and a second secondary demultiplexed signal within a second wavelength range. The first wavelength range and the second wavelength range are separated from each other by a third wavelength range. The first WDM filter has a first single unified passband including the first wavelength range, the second wavelength range, and the third wavelength range, such that the first WDM filter is configured to pass the first secondary demultiplexed signal and the second secondary demultiplexed signal to the first channel port (also called a multiband channel port). The first single unified passband may simplify fabrication of the WDM device (e.g., the WDM filter) and may reduce costs.

Figure 2:
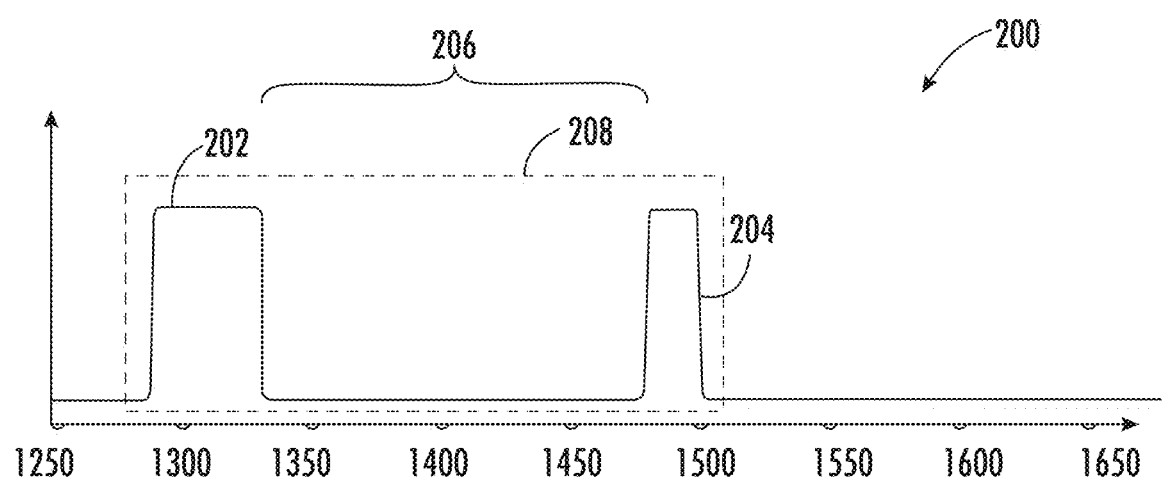
FIG. 2 is a diagram illustrating transmission spectra for a single unified passband WDM filter.

FIG. 2 is a diagram illustrating transmission spectra 200 for a single unified passband WDM filter. The transmission spectra 200 includes a first wavelength range 202 and a second wavelength range 204 separated from each other by a third wavelength range 206 (may also be referred to as intermediate wavelength range). In other words, the third wavelength range 206 is between the first wavelength range 202 and the second wavelength range 204. A WDM filter with a single unified passband 208 includes the first wavelength range 202, the second wavelength range 204, and the third wavelength range 206. In this way, the WDM filter with a single unified passband 208 is able to transmit a multiband demultiplexed signal between a common port and a multiband channel port. In certain embodiments, the ports are embodied as collimators (discussed below with reference to FIGS. 8-13). The single unified passband 208 is able to transmit a primary demultiplexed signal that includes a first secondary demultiplexed signal within the first wavelength range 202 and a second secondary demultiplexed signal within the second wavelength range 204 to be further demultiplexed downstream. The single unified passband 208 may simplify fabrication of the WDM filter and may reduce costs compared to multiband WDM filters. The single unified passband 208 is shown exaggerated in FIG. 2 for illustration purposes, and, in practice, the unified passband 208 may correspond closely to the outer limits of the first wavelength range 202 and the second wavelength range 204 to provide accurate and appropriate signal filtering.

Figure 3:
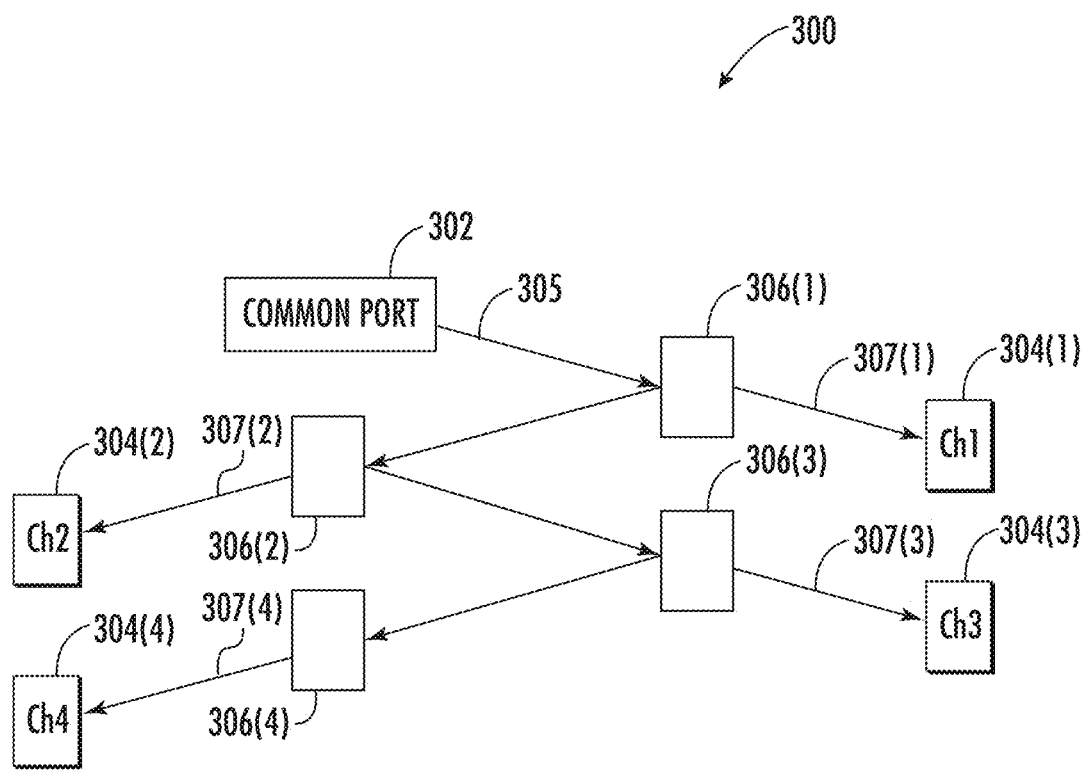
FIG. 3 is a diagram illustrating optical paths of a WDM device that uses the single unified passband of FIG. 2.

FIG. 3 is a diagram illustrating optical paths of a WDM device 300 (may also be referred to as a micro-optical device, WDM device, multiplexer/demultiplexer, etc.) that uses the single unified passband 208 of FIG. 2. The WDM device 300 includes a common port 302, a plurality of channel ports 304(1)-304(4) (may be referred to generally as a channel port 304), and a plurality of WDM filters 306(1)-306(4) (may be referred to generally as a WDM filter 306). It is noted that other configurations of the WDM device 300 may be used, and such other configurations may include more or fewer common ports 302, channel ports 304, and/or WDM filters 306, and/or other layouts of such components, may be used.

The following description is now made with reference to FIG. 3, but the description also applies to FIG. 8 (discussed below) wherein the micro-collimator 802P is in place of the common port 302, the micro-collimators 802(1)-802(4) are in the place of channel ports 304(1)-304(4), and the WDM filters 812(1)-812(4) are in the place of WDM filters 306(1)-306(4).

Referring now to FIG. 3, the common port 302 is configured for optical communication of a multiplexed signal 305 including a plurality of primary demultiplexed signals 307(1)-307(4). Each of the channel ports 304 is configured for optical communication of one of the plurality of primary demultiplexed signals 307(1)-307(4). In particular, a first channel port 304(1) is configured for optical communication of the first primary demultiplexed signal 307(1), a second channel port 304(2) is configured for optical communication of the second primary demultiplexed signal 307(2), a third channel port 304(3) is configured for optical communication of the third primary demultiplexed signal 307(3), and a fourth channel port 304(4) is configured for optical communication of the fourth primary demultiplexed signal 307(4). At least one of the channel ports 304 is a multiband channel port (e.g., channel port 304(1)) configured for transmission of a plurality of discrete secondary demultiplexed signals, as discussed below in more detail with reference to FIG. 5.

The WDM filters 306(1)-306(4) (may also be referred to as optical filters) are configured for routing the plurality of primary demultiplexed signals 307(1)-307(4) of the multiplexed signal 305 between the common port 302 and the channel ports 304. In particular, each of the WDM filters 306 is wavelength-selective including a unique passband (e.g., coating, thin film filter, etc.) to allow a portion of the optical signal to pass through the WDM filter 306 and to reflect the remaining portion of the optical signal. The unique passband may be a single band WDM filter (having a single band) or a multiband WDM filter (having a multiband). For example, in certain applications (e.g., NG-PON2 applications) one or more channel ports 304 of a WDM device 300 may be a multiband channel port for transmission of a demultiplexed signal with multiple discrete signal bands.

The WDM filters are arranged such that a multiplexed optical signal from the common port 302 can pass between the WDM filters 306 to successive ones of the WDM filters 306 for successive wavelength-selective transmission and reflection so that selected signals are transmitted to each of the channel ports 304(1)-304(4). Additionally, the WDM filters 306 are arranged such that demultiplexed optical signals from the channel ports 304(1)-304(4) can pass between the WDM filters 306 in a back-and-forth progression for multiplexing at successive ones of the WDM filters 306 and then the final multiplexed signal 305 is transmitted to the common port 302. In particular, the common port 302 serves as an input/output (I/O) port for a multiplexed signal 305 (may also be referred to as a multi-wavelength light) having wavelengths $\lambda_1$ to $\lambda_4$ while the channel ports 304 serve as the four individual channel ports. The WDM filters 306 are respectively configured to transmit wavelengths $\lambda_1$, $\lambda_2$, $\lambda_3$, and $\lambda_4$ (where wavelengths may include multiple discrete wavelengths) and reflect the other wavelengths. In a DeMux operation, the multiplexed signal 305 exits the common port 302 (that defines the I/O port) and travels toward the first WDM filter 306(1). The first WDM filter 306(1) transmits the wavelength $\lambda_1$ to the first channel port 304(1) and reflects the remaining wavelengths $\lambda_2$, $\lambda_3$, and $\lambda_4$ of multiplexed signal. This reflected multiplexed signal then proceeds to the second WDM filter 306(2), which transmits the wavelength $\lambda_2$ to the second channel port 304(2) and reflects the remaining wavelengths $\lambda_3$ and $\lambda_4$ of multiplexed signal. This process is repeated for the remaining two WDM filters 306(3) and 306(4) and channel ports 304(3), 304(4) or, in other embodiments, a greater or fewer number of filters and channel ports depending on the application, so that the wavelength components $\lambda_1$, $\lambda_2$, $\lambda_3$, and $\lambda_4$ of the multiplexed signal are distributed to their respective channel ports 304(1)-304(4). In the Mux operation, the direction of the light is reversed and the individual wavelengths $\lambda_1$, $\lambda_2$, $\lambda_3$, and $\lambda_4$ from the individual channel ports 304(1)-304(4) are combined by the WDM filters 306(1)-306(4) into a multiplexed signal 305 at the common port 302.

At least one of the WDM filters 306 has a single unified passband 208 (see FIG. 2) for transmission of a primary demultiplexed signal comprising a plurality of discrete secondary demultiplexed signals having discrete wavelength ranges. The WDM filter 306, having a single unified passband 208, may be located at any of the WDM filter 306(1)-306(4) locations and, in some embodiments, more than one of the WDM filters 306(1)-306(4) may be a single unified passband filter. The single unified passband includes the discrete wavelength ranges for transmission of the discrete secondary demultiplexed signals and any intervening wavelength ranges, as discussed in more detail below.

Figure 4:
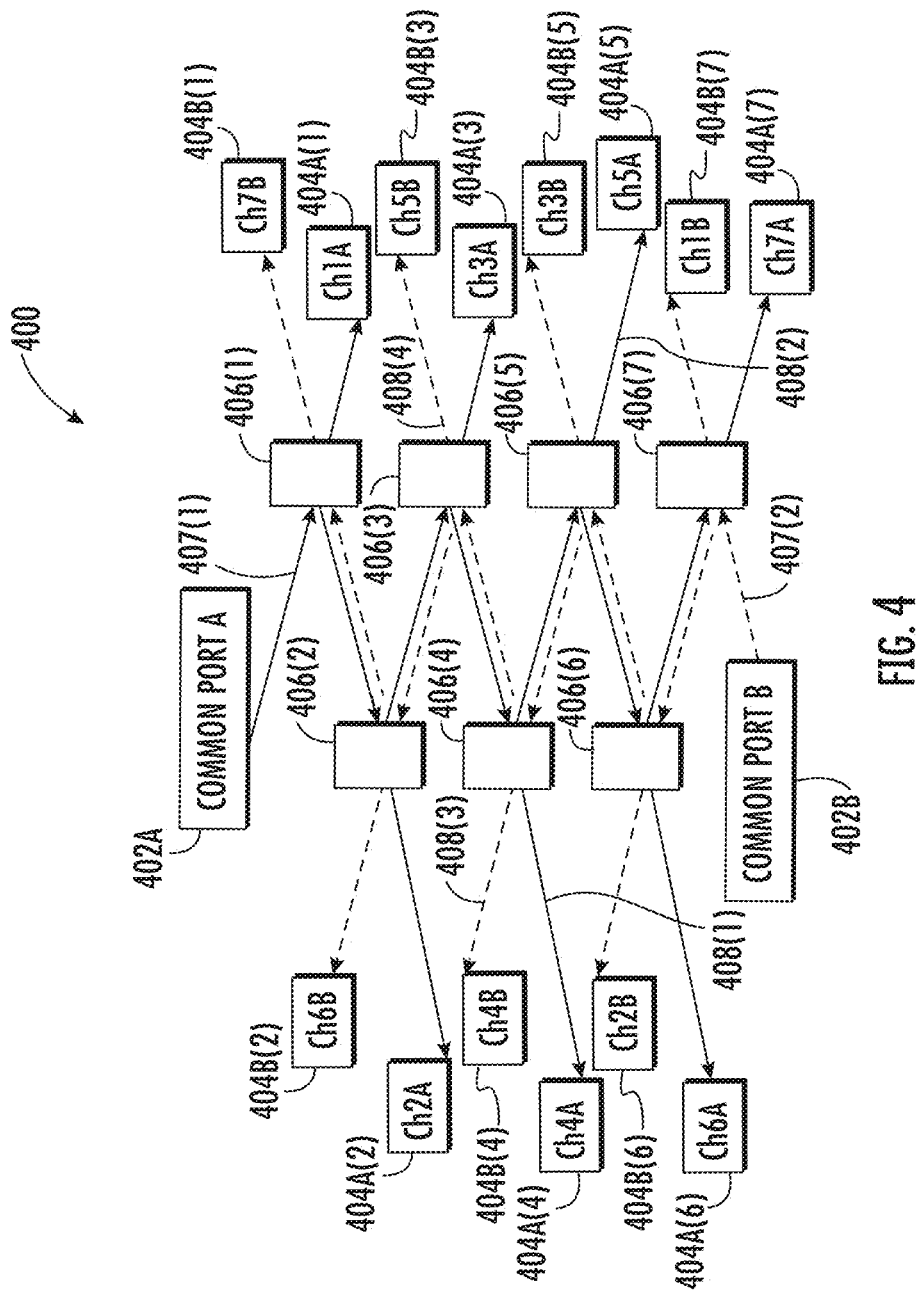
FIG. 4 is a diagram illustrating optical paths of a double density WDM device that uses the single unified passband of FIG. 2.

FIG. 4 is a diagram illustrating optical paths of a double density WDM device 400 that uses the single unified passband 208 of FIG. 2. The WDM device 400 includes a first common port 402A in communication with a first set of channel ports 404A(1)-404A(7), and a second common port 402B in communication with a second set of channel ports 404B(1)-404B(7), and a plurality of WDM filters 406(1)-406(7). WDM filters 406(1)-406(7) route signals between the first common port 402A and the first set of channel ports 404A(1)-404A(7), and route signals between the second common port 402B and the second set of channel ports 404B(1)-404B(7). At least one of the WDM filters 406(1)-406(7) includes a first single unified passband.

In certain embodiments, the first common port 402A is configured for optical communication of a first multiplexed signal 407(1) including a first demultiplexed signal 408(1) and a second demultiplexed signal 408(2), and the second common port 402B is configured for optical communication of a second multiplexed signal 407(2) including a third primary demultiplexed signal 408(3) and a fourth primary demultiplexed signal 408(4).

The first primary demultiplexed signal 307(1) (see, e.g., FIG. 3) includes a first secondary demultiplexed signal within a first wavelength range (see, e.g., FIG. 2) and a second secondary demultiplexed signal within a second wavelength range (see, e.g., FIG. 2), where the first wavelength range and the second wavelength range separated from each other by a third wavelength range (see, e.g., FIG. 2). The fourth WDM filter 406(4) has a first single unified passband (see, e.g., FIG. 2) comprising the first wavelength range, the second wavelength range, and the third wavelength range.

The fourth WDM filter 406(4) is configured to pass the first secondary demultiplexed signal and the second secondary demultiplexed signal of the first primary demultiplexed signal 408(1) of the first multiplexed signal 407(1) to the first channel port 404A(1), to pass the second primary demultiplexed signal 408(2) to the second channel port 404A(2), to pass the third demultiplexed signal 408(3) of the second multiplexed signal 407(2) and reflect the fourth demultiplexed signal 408(4) of the second multiplexed signal 407(2).

In some embodiments, the first common port 402A may be embodied as a first common collimator, the second common port 402B may be embodied as a second common collimator, channel ports 404A(1)-404A(7) of a first group may be embodied as first, second, third, fourth, fifth, sixth and seventh channel collimators, respectively, and channel ports 404B(1)-404B(7) of a second group may be embodied as first, second, third, fourth, fifth, sixth and seventh channel collimators, respectively.

Figure 5:
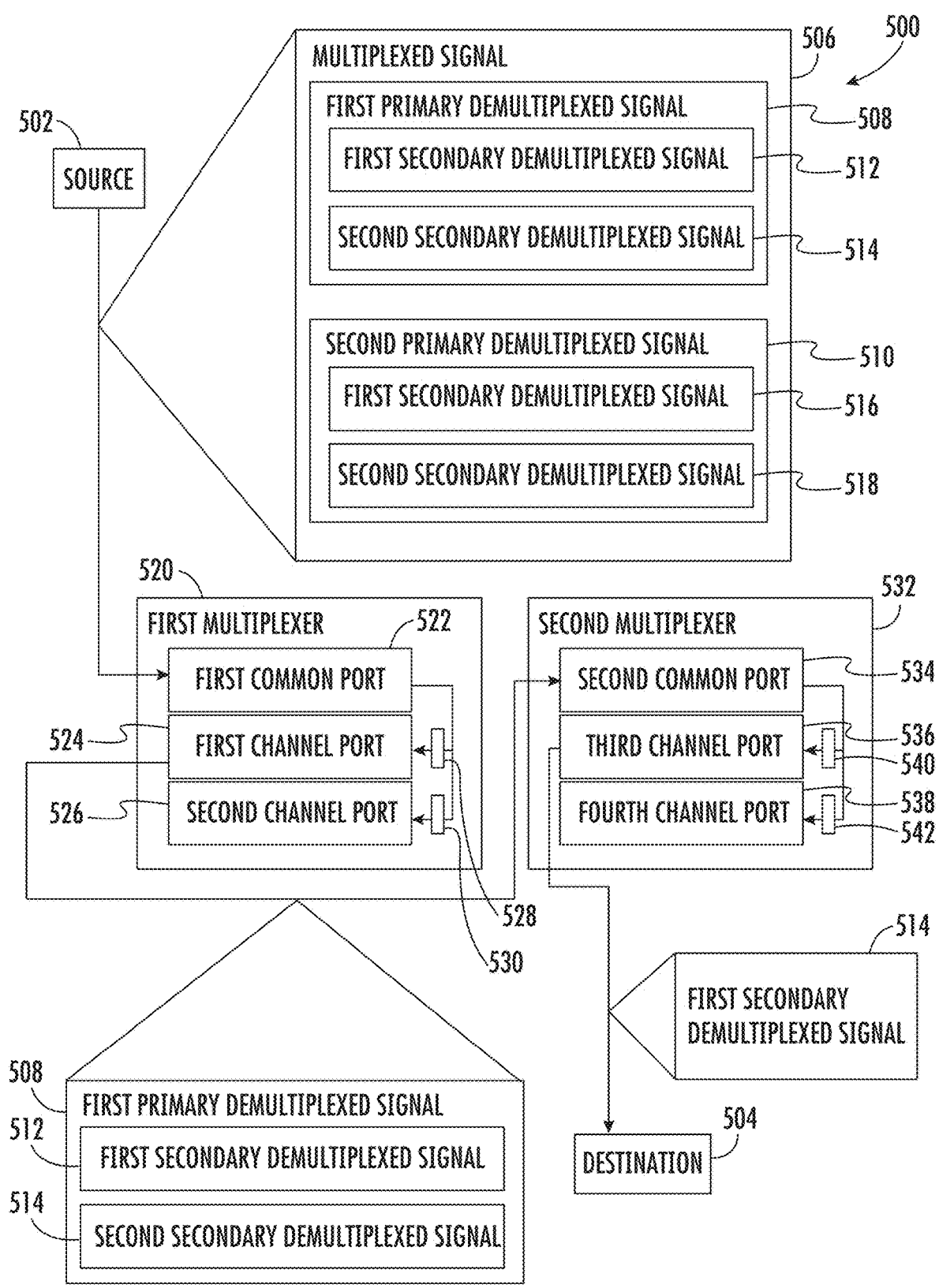
FIG. 5 is a diagram illustrating a WDM system.

FIG. 5 is a diagram illustrating a WDM system 500 including a source 502, a first multiplexer or WDM device 520, a second multiplexer or WDM device 532, and a destination 504. The first WDM device 520 utilizes a WDM filter 528 with a single unified passband 208, similar to the filter described in FIG. 2. The WDM system 500 includes a source 502 in optical communication with a destination 504 via the first WDM device 520 and the second WDM device 532. The source 502 transmits a multiplexed signal 506, where the multiplexed signal 506 includes a first primary demultiplexed signal 508 and a second primary demultiplexed signal 510. The first primary demultiplexed signal 508 includes a first secondary demultiplexed signal 512 and a second secondary demultiplexed signal 514. The first secondary demultiplexed signal 512 is within a first wavelength range and the second secondary demultiplexed signal 514 is within a second wavelength range. The first wavelength range and the second wavelength range are separated from each other by a third wavelength range. In some embodiments, the first primary demultiplexed signal comprises a GPON signal, and the second primary demultiplexed signal comprises an XGS-PON signal or an NG-PON2 signal.

The second primary demultiplexed signal 510 may include a first secondary demultiplexed signal 516 and a second secondary demultiplexed signal 518. The first secondary demultiplexed signal 516 is within a fourth wavelength range and the second secondary demultiplexed signal 518 is within a fifth wavelength range. The fourth wavelength range and the fifth wavelength range are separated from each other by a sixth wavelength range.

The multiplexed signal 506 is transmitted from the source 502 to the first multiplexer 520 (e.g., WDM device), where the multiplexed signal 506 is routed from a first common port 522 to a first WDM filter 528. The first WDM filter 528 routes the first primary demultiplexed signal 508 from the first common port 522 to a first channel port 524. The first WDM filter 528 also routes (i.e., reflects) the second primary demultiplexed signal 510 to a second channel port via a second WDM filter 530. In other words, the first WDM filter 528 has a first single unified passband comprising the first wavelength range, the second wavelength range, and the third wavelength range. The first WDM filter 528 is configured to pass the first secondary demultiplexed signal 512 and the second secondary demultiplexed signal 514 to the first channel port 524 and to pass the second primary demultiplexed signal 510 to the second channel port 526. The first channel port 524 is configured for optical communication of the first primary demultiplexed signal 508 and the second channel port 526 is configured for optical communication of the second primary demultiplexed signal 510. The first multiplexer 520 may include additional channel ports and WDM filters in other embodiments.

The first WDM filter 528 is a first single unified passband filter. The second WDM filter 530 could be a single passband filter, a multiband filter, or a single unified passband filter. In other words, the first WDM filter 528 has a single unified passband, and the second WDM filter 530 has a single passband, a multiband (may also be referred to as a multi passband), or a single unified passband. In certain embodiments, the second WDM filter 530 has a multiband including the fourth wavelength range and the fifth wavelength range, and the WDM filter 530 is configured to reflect the sixth wavelength range.

The first primary demultiplexed signal 508 (which includes the first secondary demultiplexed signal 512 and the second secondary demultiplexed signal 514) is transmitted from the first channel port 524 to a second multiplexer 532 (e.g., WDM device), where the first primary demultiplexed signal 508 is routed from a second common port 534 to a third channel port 536 and a fourth channel port 538 via third and fourth WDM filters 540, 542. In particular, the third WDM filter 540 routes the first secondary demultiplexed signal 512 from the second common port 534 to the third channel port 536 and routes (e.g., reflects) the second secondary demultiplexed signal 514 towards the fourth WDM filter 542. The fourth WDM filter 542 routes the second secondary demultiplexed signal 514 from the third WDM filter 540 to the fourth channel port 538. The third WDM filter 540 and fourth WDM filter 542 could each be a single passband filter, a multiband filter, or a single unified passband filter. The first secondary demultiplexed signal 512 is transmitted from the third channel port 536 to the destination 504. Thus, the second common port 534 is configured for receiving the first primary demultiplexed signal 508 from the first channel port 524, the third channel port 536 is configured for optical communication of the first secondary demultiplexed signal 512, the fourth channel port 538 is configured for optical communication of the second secondary demultiplexed signal 514, and the third WDM filter 540 (also called the second WDM filter when referring only to those WDM filters used for the first secondary demultiplexed signal 512) has a second passband configured to pass the first secondary demultiplexed signal 512 to the third channel port 536 and the destination 504. The first and second WDM devices 520, 532 may be located in different portions of a network to allow for increased customization and decreased cost when compared with the use of one or more multiband WDM filters.

FIGS. 6A-6D illustrate a particular implementation of a WDM device, WDM device, and single unified passband as discussed with reference to FIGS. 2-5.

Figure 6A:
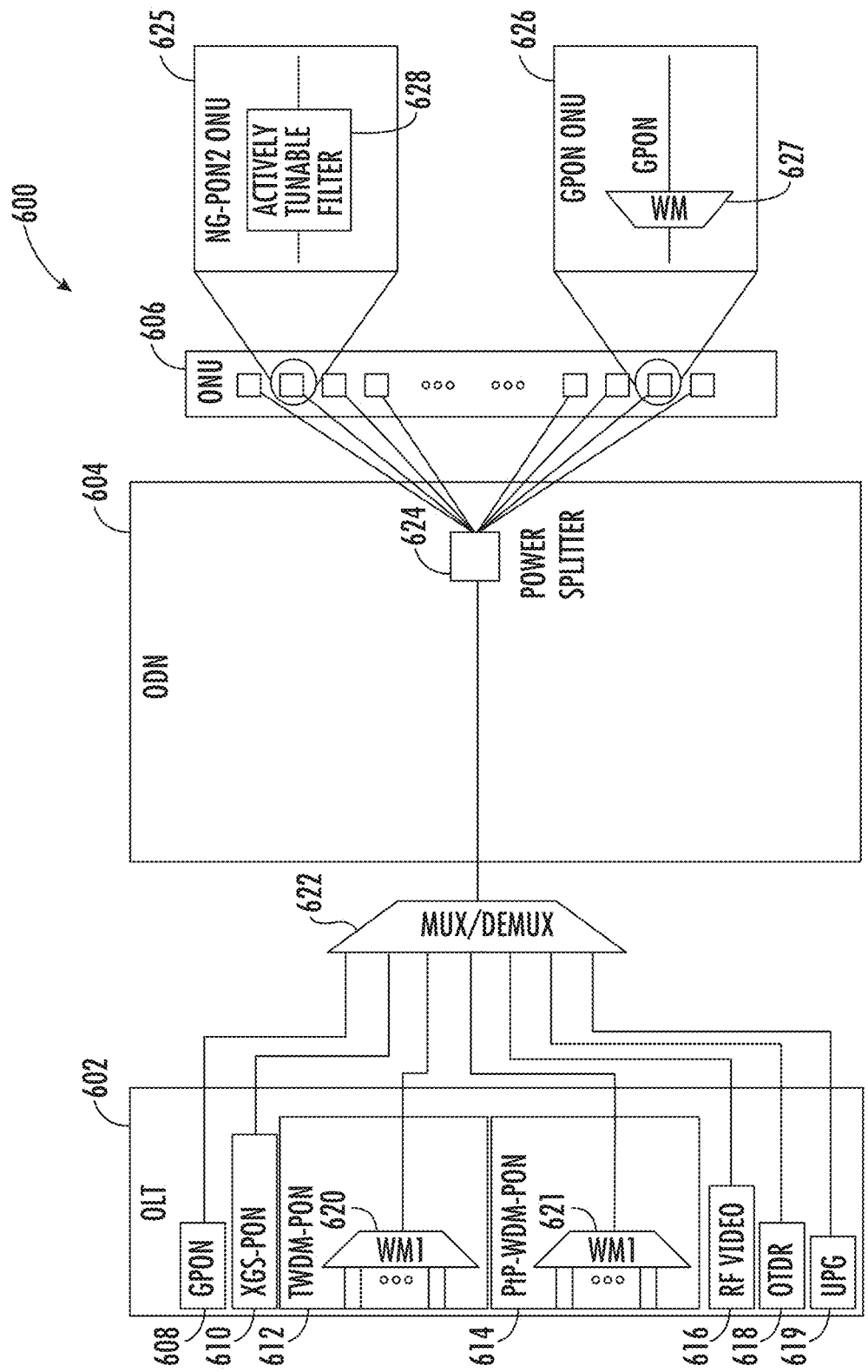
FIG. 6A is a system diagram illustrating an exemplary WDM device.

FIG. 6A is a system diagram illustrating an exemplary WDM device 600. The WDM device 600 shows an NG- PON2 network with a bi-directional Mux/Demux 622. The WDM device 600 includes a group of OLTs (optical line terminals) 602 in optical communication via an ODN 604 (optical distribution network) with a group of ONUs (optical network units) 606. The group of OLTs 602 includes a GPON (Gigabit-capable Passive Optical Network) OLT 608 for transmitting a GPON signal, XGS-PON OLT 610 for transmitting an XGS-PON signal, TWDM-PON OLT 612 (may also be referred to as NG-PON2 TWDM-PON) for transmitting a TWDM-PON signal, PtP-WDM-PON OLT 614 (may also be referred to as NG-PON2 PtP-WDM-PON) for transmitting a PtP-WDM-PON signal, RF-video (radio frequency-video) OLT 616 for transmitting an RF-video signal, OTDR (optical time-domain reflectometer) OLT 618 for transmitting an OTDR signal, and UPG OLT 619 for transmitting a UPG signal. Of course, other signals could be used, and the group of OLTs 602 may include more or fewer OLTs or OLT types. Referring specifically to the TWDM-PON OLT 612 and the PtP-WDM-PON OLT 614, in the downstream direction multiple wavelengths in TWDM-PON or PtP-WDM-PON are multiplexed with a WM1 620, 621. The signals are multiplexed together with signals from one or more of the other ODNs (e.g., GPON ODN 608, XGS-PON ODN 610, TWDM-PON OLT 612, PtP-WDM-PON OLT 614, RF-video OLT 616, OTDR OLT 618, and UPG OLT 619) and transmitted via the MUX/DEMUX 622 and the power splitter 624 (which may also be a WDM device and may be referred to as WDM device 624) to the group of ONUs 606. The single unified passband WDM filter design described above can be retroactively incorporated into existing communication architecture, as described in more detail below.

The Mux/Demux 622 (e.g., WDM device) transmits signals from the group of OLTs 602 to the power splitter 624 of the ODN 604. At least one of the Mux/Demux 622 and the power splitter 624 includes at least one WDM filter with a single unified passband. In certain embodiments, the Mux/Demux 622 in a central office works as a coexistence element (i.e., to enable implementation of PON access network evolutions). In the ODN 604, the power may be equally distributed to multiple ONUs 606. The power splitter 624 then routes the signals to their respective ONU 606, such as an NG-PON2 ONU 625 and GPON ONU 626.

For example, for GPON the downstream signal (1480-1500 nm) may be filtered out of the signals from all the OLTs 602, with a GPON Wavelength Mux/Demux (WM) 627, and passed to one or more receivers (not shown). The GPON OLT 602 continuously transmits signals with embedded address labels for different GPON ONUs 626. Each ONU 606 transmits upstream signal (1290-1330 nm) at an assigned time slot, so the GPON OLT 608 receives signals from only one ONU 606 at any given time. The upstream signal follows the reciprocal optical path through the power splitter 624 and is multiplexed with signals from other ONUs 606. The Mux/Demux 622 demultiplexes the signals and sends the GPON upstream signal to GPON OLT 608.

For TWDM-PON, multiple wavelengths (passbands in downstream 1596-1602 nm) are filtered by an actively tunable filter 628 so that only desired wavelengths are passed to one or more receivers (not shown). In the upstream direction, each ONU 606 can send a signal with a dynamically assigned wavelength (from passbands in upstream 1524-1544 nm). The upstream signal is also multiplexed by the power splitter 624 and demultiplexed by the Mux/Demux 622 as in GPON. The WM1 620 further demultiplexes the TWDM-PON upstream signals and separates the wavelengths to corresponding TWDM-PON OLTs 612.

In some embodiments, the connection for XGS-PON, RF-Video, OTDR and UPG is similar to that of GPON and the connection for PtP-WDM-PON is similar to that of TWDM-PON. While a power splitter 624 is shown, an additional MUX/DEMUX similar to MUX/DEMUX 622 could be used in its place.

Figure 6B:
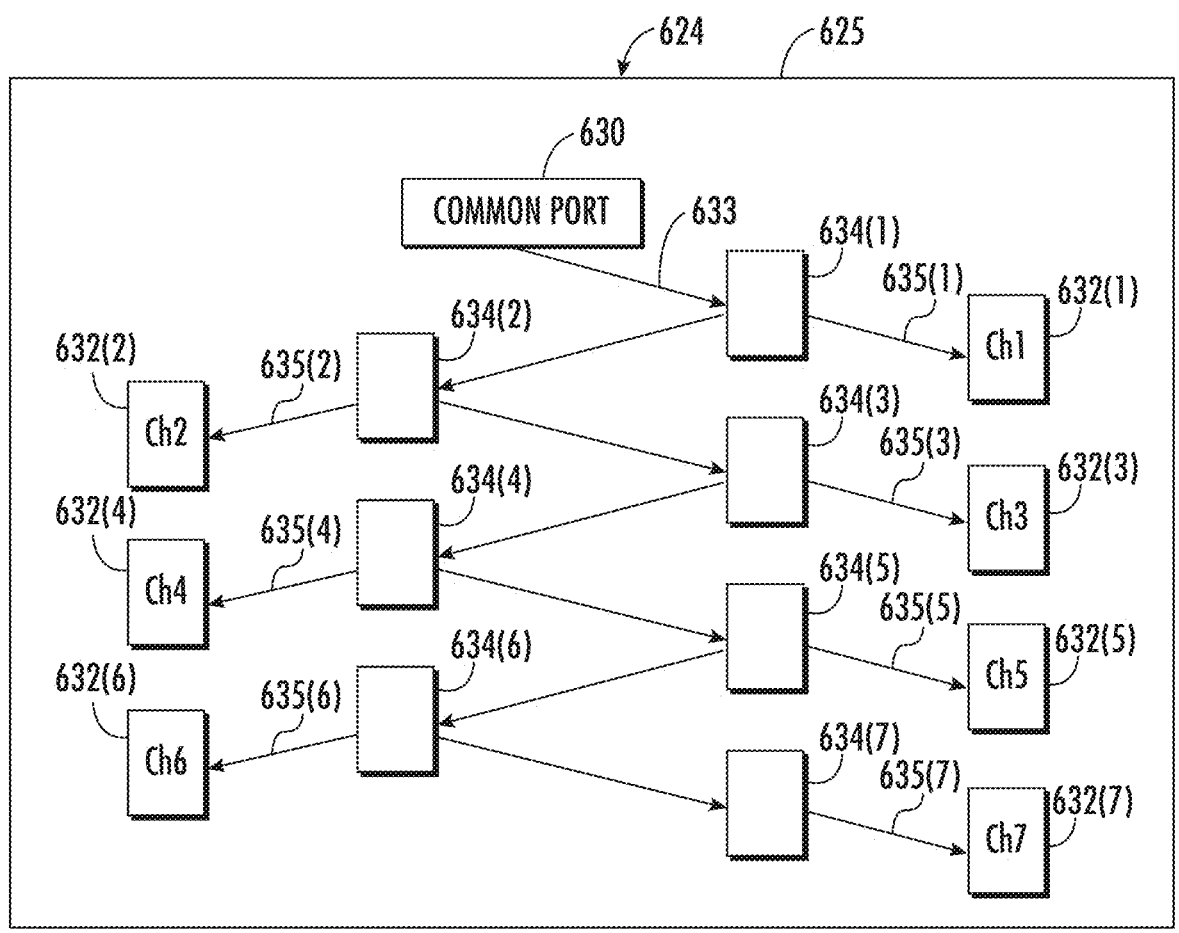
FIG. 6B is a diagram illustrating optical paths of the WDM device of FIG. 6A.

FIG. 6B is a diagram illustrating optical paths of the WDM device 624 (also called the power splitter 624) of FIG. 6A. The WDM device 624 includes a housing 625 and a common port 630, a plurality of channel ports 632(1)-632(7) and a plurality of WDM filters 634(1)-634(7) positioned within the housing 625. The plurality of WDM filters 634(1)-634(7) route signals between the common port 630 and the plurality of channel ports 632(1)-632(7), as similarly discussed above with respect to FIG. 3.

The first channel port 632(1) is configured to transmit GPON signals to and from the GPON OLT 608 (see FIG. 6A). The second channel port 632(2) is configured to transmit XGS-PON signals to and from the XGS-PON OLT 610 (see FIG. 6A). The third channel port 632(3) is configured to transmit TWDW-PON signals to and from the TWDM-PON OLT 612 (see FIG. 6A). The fourth channel port 632(4) is configured to transmit PtP-WDM-PON signals to and from the PtP-WDM-PON OLT 614 (see FIG. 6A). The fifth channel port 632(5) is configured to transmit RF-video signals to and from the RF-video PON 616 (see FIG. 6A). The sixth channel port 632(6) is configured to transmit OTDR signals to and from the OTDR OLT 618 (see FIG. 6A). The seventh channel port 632(7) is configured to transmit UPG signals to and from the UPG OLT 620 (see FIG. 6A).

In other words, the common port 630 is configured to transmit a multiplexed signal 633 including a first primary demultiplexed signal 635(1), second primary demultiplexed signal 635(2), third primary demultiplexed signal 635(3), fourth primary demultiplexed signal 635(4), fifth primary demultiplexed signal 635(5), sixth primary demultiplexed signal 635(6), and seventh primary demultiplexed signal 635(7). In certain embodiments, the first channel port 632(1) is configured to transmit the first primary demultiplexed signal 635(1) (including a GPON signal). The second channel port 632(2) is configured to transmit the second primary demultiplexed signal 635(2) (including a XGS-PON signal or an NG-PON2 signal). The third channel port 632(3) is configured to transmit the third primary demultiplexed signal 635(3) (including a NG-PON2 signal). The fourth channel port 632(4) is configured to transmit the fourth primary demultiplexed signal 635(4) (including a radio frequency (RF) signal). The fifth channel port 632(5) is configured to transmit the fifth primary demultiplexed signal 635(5) (including an OTDR signal).

The first primary demultiplexed signal 635(1) includes a first secondary demultiplexed signal within a first wavelength range (see, e.g., FIGS. 2 and 5) and a second secondary demultiplexed signal within a second wavelength range (see, e.g., FIGS. 2 and 5), where the first wavelength range and the second wavelength range are separated from each other by a third wavelength range (see, e.g., FIGS. 2 and 5). The first WDM filter 634(1) has a first single unified passband (see, e.g., FIGS. 2 and 5) comprising the first wavelength range, the second wavelength range, and the third wavelength range.

The first WDM filter 634(1) is configured to pass the first secondary demultiplexed signal and the second secondary demultiplexed signal 635(2) to the first channel port 632(1) and to pass the second primary demultiplexed signal to the second channel port 632(2). The second WDM filter 634(2)

has a second passband, and the second WDM filter 634(2) is configured to pass the second primary demultiplexed signal 635(2) to the second channel port 632(2). The third WDM filter 634(3) has a third passband, and the third WDM filter 634(3) is configured to pass the third primary demultiplexed signal 635(3) to the third channel port 632(3). The fourth WDM filter 634(4) has a fourth passband, and the fourth WDM filter 634(4) is configured to pass the fourth primary demultiplexed signal 635(4) to the fourth channel port 632(4). The fifth WDM filter 634(5) has a fifth passband, and the fifth WDM filter 634(5) is configured to pass the fifth primary demultiplexed signal 635(5) to the fifth channel port 632(5).

Figure 6C:
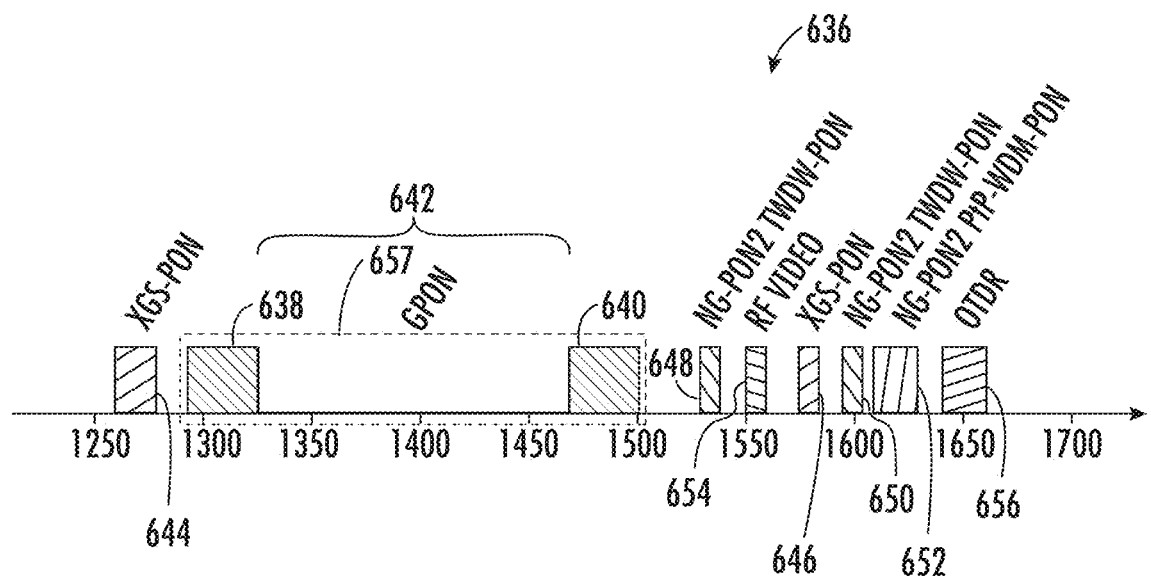
FIG. 6C is a diagram illustrating transmission spectra for the WDM device of FIG. 6B.

FIG. 6C is a diagram illustrating an example transmission spectra 636 for the WDM device 624 of FIG. 6B. The signal from the GPON OLT 608 (see FIG. 6A) includes a first discrete wavelength range 638 and a second discrete wavelength range 640 separated by a third wavelength range 642. The signal from the XGS-PON OLT 610 includes a first discrete wavelength range 644 and a second discrete wavelength range 646. The signal from the NG-PON2 TWDW-PON OLT 612 includes a first discrete wavelength range 648 and a second discrete wavelength range 650. The signal from the NG-PON2 PtP-WDM-PON OLT 614 includes a first discrete wavelength range 652. The signal from the RF-video OLT 610 includes a first discrete wavelength range 654. The signal from the OTDR OLT 618 includes a first discrete wavelength range 656.

A WDM filter 634(1) (see FIG. 6B) with first single unified passband 657 routes a first primary GPON signal including a first secondary GPON signal and a second secondary GPON signal to the first channel port 632(1). The first single unified passband 657 is configured to include the first discrete wavelength range 638, the second discrete wavelength range 640 and the third wavelength range 642. It is noted that no other signals of any other channel are positioned in the third wavelength range 642 between the first discrete wavelength range 638 and the second discrete wavelength range 640 for GPON 608 (see FIGS. 6A and 6C). In other words, the third wavelength range 642 is not used by any of the other channels. This is preferable as there may be less leakage between channel ports 632(1)-632(7) (see FIG. 6B).

The remaining WDM filters 634(2)-634(7) (see FIG. 6B) could be single passband (for single wavelength ranges) or multiband (for multiple discrete wavelength ranges).

Figure 6D:
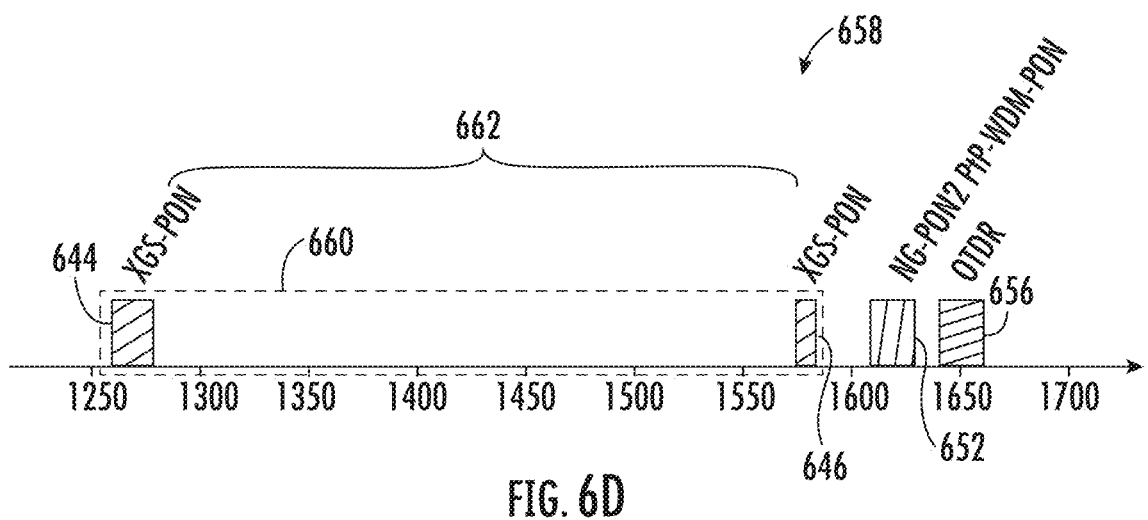
FIG. 6D is a diagram illustrating transmission spectra for an alternative WDM device of FIG. 6B including a second single unified passband.

FIG. 6D is a diagram illustrating transmission spectra 658 for an alternative WDM device 624 of FIG. 6B including a second single unified passband 660. Depending on signal isolation and other performance requirements, the WDM device 624 (FIG. 6A) could include multiple single unified passband WDM filters. For example, if the signal from the GPON OLT 608, the signal from the TWDW-PON OLT 612, and the signal from the RF-video OLT 616 (see FIG. 6A) have been routed from the multiplexed signal (to channels ports 632(1)-632(3) by WDM filters 634(1)-634(3)), then the fourth WDM filter 634(4) could have a single unified passband 660. In particular, the second single unified passband 660 could include the first wavelength range 644, second wavelength range 646, and a third intermediate wavelength range 662. The third intermediate wavelength range 662 includes wavelength ranges of other already removed signals, such as RF-video 616.

Figure 7:
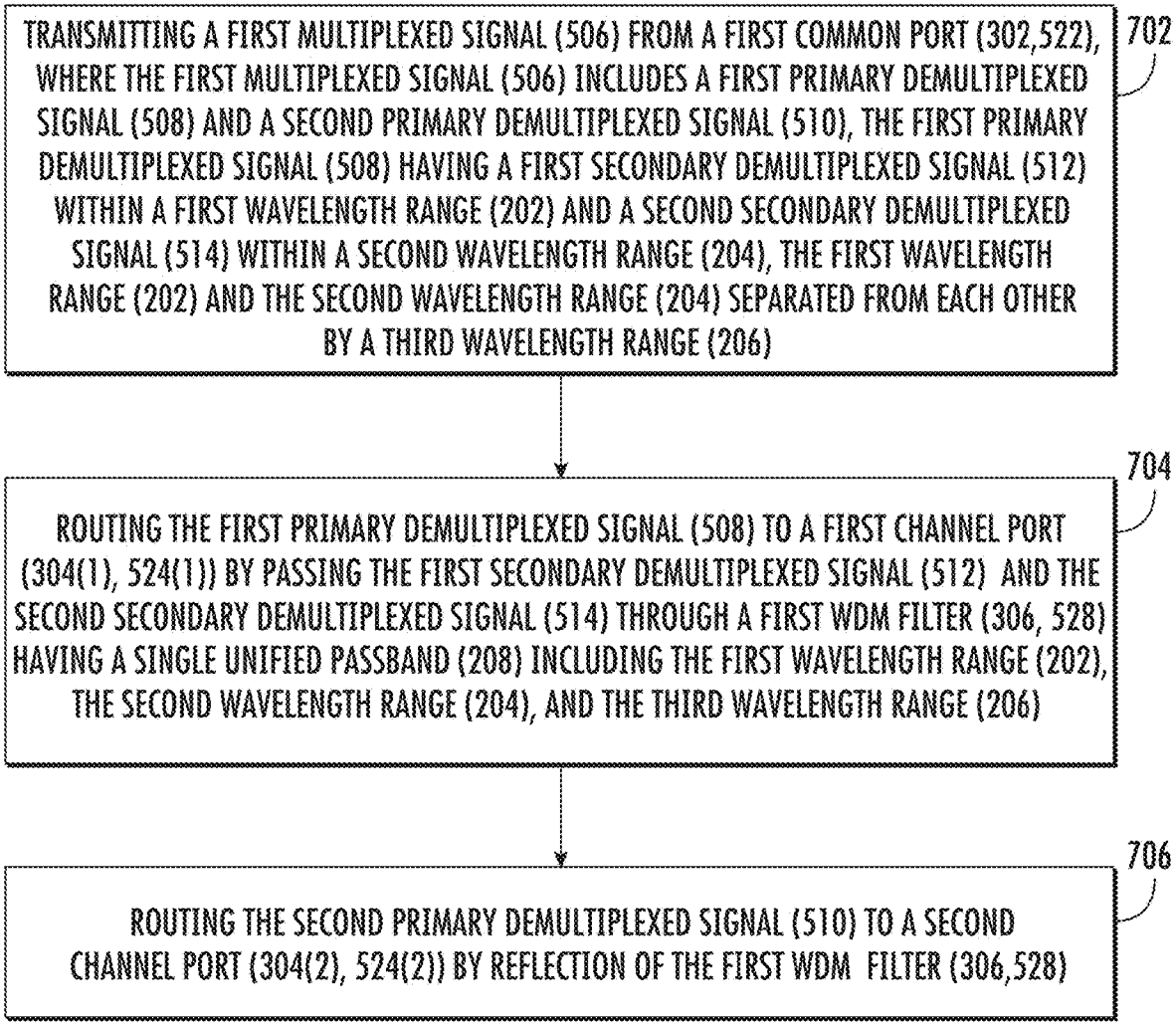
FIG. 7 is a flowchart of steps for WDM routing.

FIG. 7 is a flowchart of steps 700 for WDM routing. In step 702, a first multiplexed signal 506 (see FIG. 5) is transmitted from a first common port 302, 522 (see FIGS. 3 and 5). The first multiplexed signal 506 includes a first primary demultiplexed signal 508 (see FIG. 5) and a second primary demultiplexed signal 510 (see FIG. 5). The first primary demultiplexed signal 508 includes a first secondary demultiplexed signal 512 (see FIG. 5) within a first wavelength range 202 (see FIG. 2) and a second secondary demultiplexed signal 514 (see FIG. 5) within a second wavelength range 204 (see FIG. 2). The first wavelength range 202 and the second wavelength range 204 are separated from each other by a third wavelength range 206 (see FIG. 2). In step 704, the first primary demultiplexed signal 508 is routed to the first channel port 304(1), 524(1) (see FIGS. 3 and 5) by passing the first secondary demultiplexed signal 512 and the second secondary demultiplexed signal 514 through a first WDM filter 306, 528 (see FIGS. 3 and 5) having a single unified passband 208 (see FIG. 2) including the first wavelength range 202, the second wavelength range 204, and the third wavelength range 206. In step 706, the second primary demultiplexed signal 510 is routed to a second channel port 304(2), 524(2) (see FIGS. 3 and 5) by reflection of the first WDM filter 306, 528.

Figure 8:
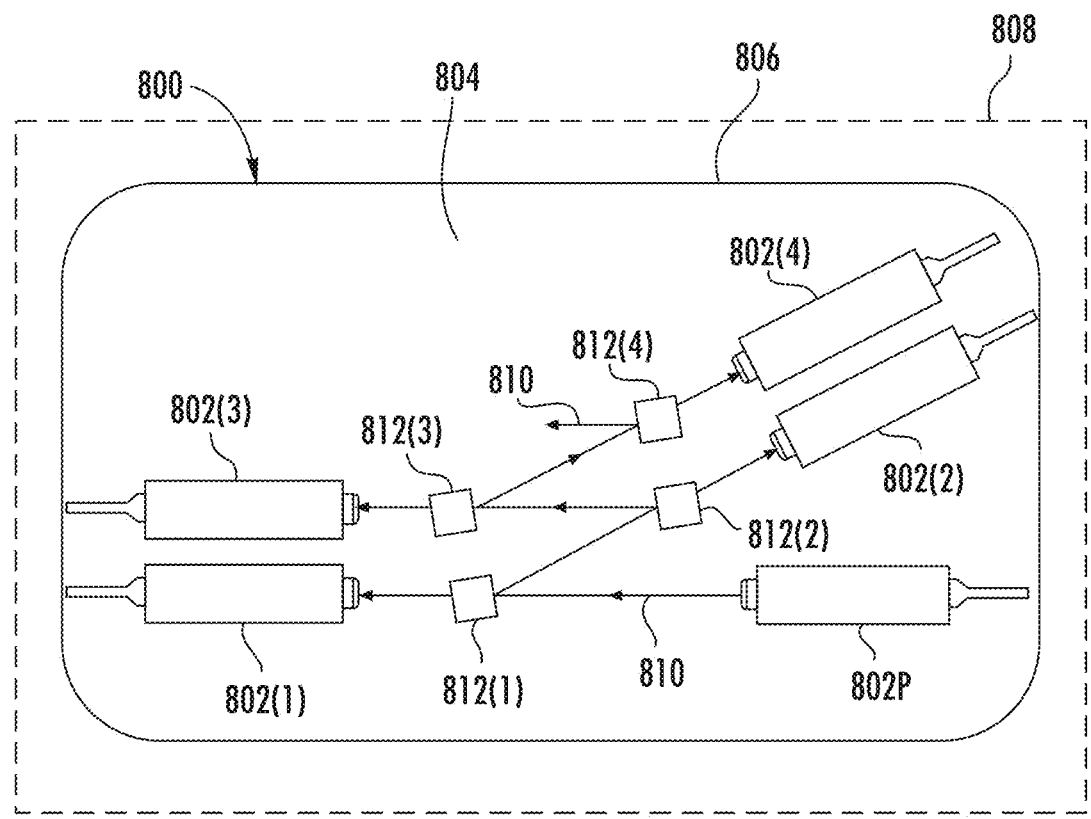
FIG. 8 is a top view of an example WDM micro-optical device including the single unified passband of FIG. 2.

FIG. 8 is a top view of a WDM micro-optical device 800 that is identical to the WDM device 300 of FIG. 3 except that the common port 302 of FIG. 3 is embodied as common collimator 802P in FIG. 8 and each of the channel ports 304(1)-304(4) of FIG. 3 are embodied as channel collimators 802(1)-802(4) in FIG. 8, respectively. In general, the WDM micro-optical device 800 includes micro-collimators 802 (e.g., micro-collimators 802P and 802(1)-802(4)) supported on an upper surface 804 of the support substrate 806. In an example, the WDM micro-optical device 800 can include a housing 808 that defines a WDM module. In an example, the WDM module can have a small form factor as defined by length (e.g., in the range of 30 mm to 41 mm), width (e.g., in the range of 14 mm to 28 mm), and height (within the range of 5 mm to 6 mm).

The particular example of a WDM micro-optical device 800 (may also be referred to as a WDM micro-optical device 800) of FIG. 8 is in the form of a four-channel WDM device that employs five of the micro-collimators 802, including the common collimator 802P and the micro-collimators 802(1)-802(4), in optical communication with each other along the optical signal path 810 via the WDM filters 812(1)-812(4). It is noted that a more basic WDM micro-optical device 800 can employ only three micro-collimators 802 and is used to separate or combine two wavelengths. Likewise, more complicated WDM micro-optical devices 800 can employ many more micro-collimators 802 to separate or combine many more wavelengths besides two wavelengths or even four wavelengths (e.g., tens or even hundreds of different wavelengths). In examples, the WDM channels can be dense WDM (DWDM) channels or coarse WDM (CWDM) channels. Other types of micro-optical devices 800 besides the WDM micro-optical device described herein can also be formed using the basic techniques described herein. For example, the WDM micro-optical device 800 can be used to form many types of free-space optical fiber devices, as well as compact variable optical attenuators, switches, optical amplifiers, taps, optical couplers/splitters, optical circulators, optical isolators, optical time-domain reflectometer (OTDRs), etc.

In an example, the support substrate 806 is made of glass (e.g., quartz) or sapphire. In another example, the support substrate 806 is made of a glass that is receptive to the formation of glass bumps. In other examples, the support substrate 806 can be made of stainless steel or silicon, a low-CTE metal alloy (e.g., having a CTE of <10 ppm/° C., or more preferably CTE<5 ppm/° C., or even more preferably CTE<1 ppm/° C.). Examples of metal alloys having such a low CTE include the nickel-iron alloy 64FeNi also known in the art under the registered trademarked INVAR® alloy or the nickel-cobalt ferrous alloy known in the art under the registered trademark KOVAR® alloy. In an example, the upper surface 804 is precision polished to be flat to within a tolerance of 0.005 mm so that the micro-collimators 802 can be precision mounted to the upper surface 804. In an example, the support substrate 806 includes one or more reference features, such as alignment fiducials, for positioning and/or aligning the micro-collimators 802 and other optical components (e.g., optical filters, other micro-collimators, etc.).

FIGS. 9-13 are views of example collimators and collimator arrays for use with the components and devices of FIGS. 2-8.

Figure 9:
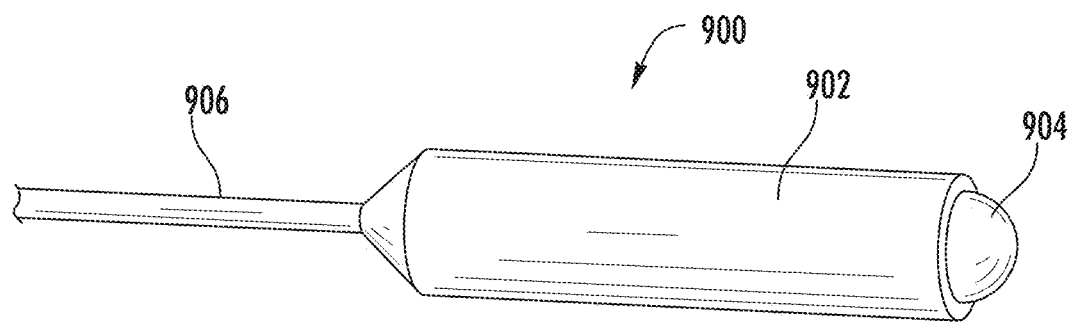
FIG. 9 is a perspective view of an example steel-tube collimator for use with the components and devices of FIGS. 2-8.

FIG. 9 is a perspective view of an example steel-tube collimator 900 for use with the components and devices of FIGS. 2-8. The collimator narrows a beam of particles or waves. In other words, the collimator causes the directions of motion to become more aligned in a specific direction. The steel-tube collimator 900 includes a steel-tube body 902, with a curved lens 904 at one end of the steel-tube body, and a fiber pigtail 906 (may also be referred to as a fiber optic pigtail) at an opposite end of the steel-tube body.

Figure 10A:
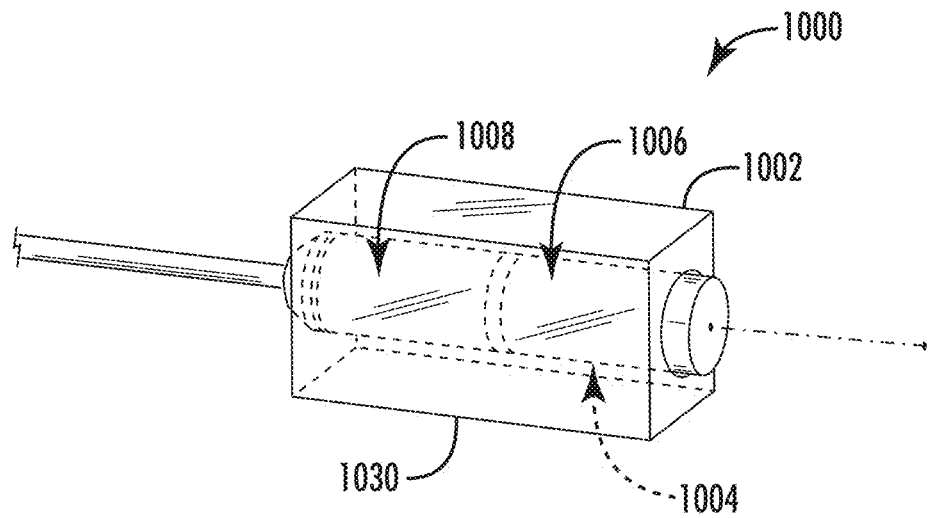
FIG. 10A is a perspective view of an example square tube collimator for use with the components and devices of FIGS. 2-8.
Figure 10B:
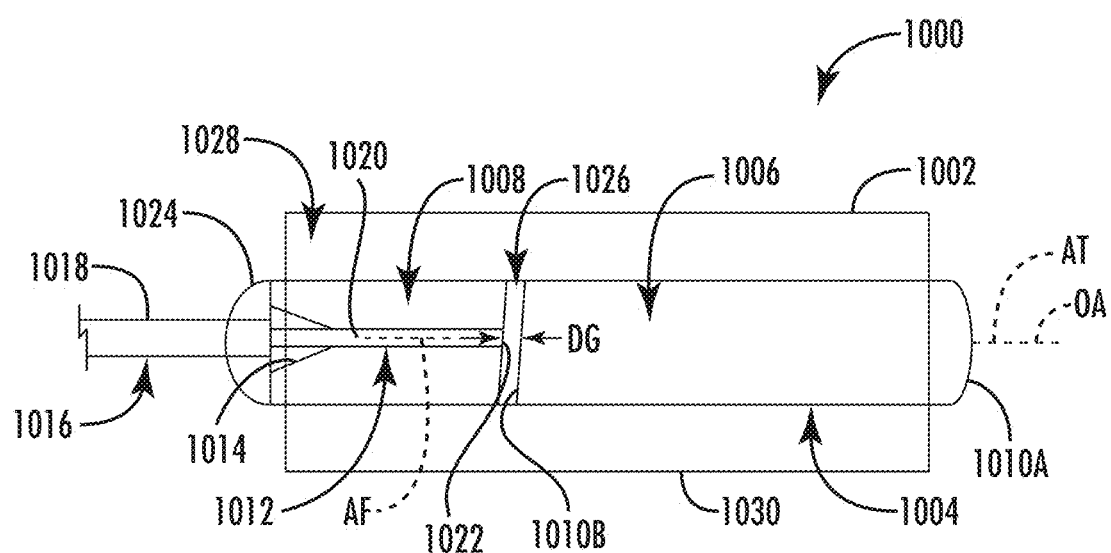
FIG. 10B is a cross-sectional top view of the square tube collimator of FIG. 10A.

FIGS. 10A and 10B are perspective views of an example square tube collimator for use with the components and devices of FIGS. 2-8. A square tube collimator 1000 includes a glass tube 1002 (e.g., cylindrical) with a central bore 1004. As used herein, the term "cylindrical" is used in its most general sense and can be defined as a three-dimensional object formed by taking a two-dimensional object and projecting it in a direction perpendicular to its surface. Thus, a cylinder, as the term is used herein, is not limited to having a circular cross-section shape but can have any cross-sectional shape, such as the square cross-sectional shape described below by way of example.

The square tube collimator 1000 further includes optical elements, such as a collimating lens 1006, ferrule 1008, etc., which can be secured to the glass tube 1002 using a securing mechanism (e.g., an adhesive). The collimating lens 1006 has a front surface 1010A and a back surface 1010B opposite thereto. In the example shown, the front surface 1010A is convex while the back surface 1010B can be angled, e.g., in the x-z plane as shown. In an example, the front surface 1010A of collimating lens 1006 can reside outside of the central bore 1004, i.e., the front-end portion of the collimating lens 1006 can extend slightly past the front end of the glass tube 1002. In an example, the collimating lens 1006 can be formed as a gradient-index (GRIN) element that has a planar front surface 1010A. In an example, the collimating lens 1006 can consist of a single lens element while in another example it can consist of multiple lens elements. In the discussion below, the collimating lens 1006 is shown as a single lens element for ease of illustration and discussion.

The optical fiber support member is the form of a ferrule 1008. The ferrule 1008 includes a central bore 1012 that runs between a front end and a back end along a ferrule central axis AF, which in an example is co-axial with the tube central axis AT of the glass tube 1002 and the optical axis OA as defined by the collimating lens 1006. The central bore 1012 can include a flared portion 1014 at the back end of the ferrule 1008.

An optical fiber 1016 has a coated portion 1018, and an end portion 1020 is bare glass (e.g., is stripped of the coated portion) and is thus referred to as the "bare glass portion." The bare glass portion 1020 includes a polished end face 1022 that defines a proximal end of the optical fiber. The bare glass portion 1020 of the optical fiber 1016 extends into the central bore 1012 of the ferrule 1008 at the back end of the ferrule. A securing element 1024 can be disposed around the optical fiber 1016 at the back end of the ferrule 1008 to secure the optical fiber to the ferrule. The front end of the ferrule 1008 is angled in the x-z plane and is axially spaced apart from the angled back end of the collimating lens to define a gap 1026 that has a corresponding axial gap distance DG. While a glass optical fiber is described above, other types of optical fibers may be used, such as, for example, a plastic optical fiber.

The ferrule 1008, optical fiber 1016, and securing element 1024 constitute a fiber pigtail 1028, which can be said to reside at least partially within the bore 1004 adjacent the back end of the glass tube 1002. Thus, in an example, the square tube collimator 1000 includes only the glass tube 1002, the collimating lens 1006, and the fiber pigtail 1028. The glass tube 1002 serves in one capacity as a small lens barrel that supports and protects the collimating lens 1006 and fiber pigtail 1028, particularly the bare glass portion 1020 and its polished end face 1022. The glass tube 1002 also serves in another capacity as a mounting member that allows for the square tube collimator 1000 to be mounted to a support substrate. In this capacity, at least one flat surface 1030 serves as a precision mounting surface.

In an example, the glass tube 1002, the collimating lens 1006, and the ferrule 1008 are all made of a glass material, and further in an example, are all made of the same glass material. Making the glass tube 1002, the collimating lens 1006, and the ferrule 1008 out of a glass material has the benefit that these components will have very close if not identical coefficients of thermal expansion (CTE). This feature is particularly advantageous in environments that can experience large swings in temperature.

In an example, the optical elements used in micro-optical systems are sized to be slightly smaller than the diameter of the bore 1004 (e.g., by a few microns or tens of microns) so that the optical elements can be inserted into the bore 1004 and be movable within the bore 1004 to a select location. In an example, the select location is an axial position where the optical element resides for the micro-optical system to have optimum or substantially optimum optical performance. Here, substantially optimum performance means performance that may not be optimum but that is within a performance or specification for the micro-optical system.

In another example, the optical elements have a clearance with respect to the bore 1004 in the range of a few microns (e.g., 2 microns or 3 microns) to tens of microns (e.g., 20 microns up to 50 microns). A relatively small value for the clearance allows for the optical elements to be well-aligned with the central bore axis AB, e.g., to within a few microns (e.g., from 2 microns to 5 microns).

The optical elements and the support/positioning elements can be inserted into and moved within the bore 1004 to their select locations using micro-positioning devices. The optical elements and the support/positioning elements can be secured within the bore 1004 using a number of securing techniques. One example of a securing technique uses a securing feature that is an adhesive (e.g., a curable epoxy). Another securing technique uses a securing feature that involves a glass soldering to create one or more glass solder points. Another securing technique uses glass welding to create a securing feature in the form of one or more glass welding points. A combination of these securing features can also be employed.

Thus, one or more optical elements can be secured within the bore 1004 using one or more securing features, and can also be supported and/or positioned using one or more support/positioning elements. The non-adhesive securing techniques described below allow for the micro-optical systems disclosed herein to remain free of adhesives so that, for example, micro-optical systems can consist of glass only.

Figure 11A:
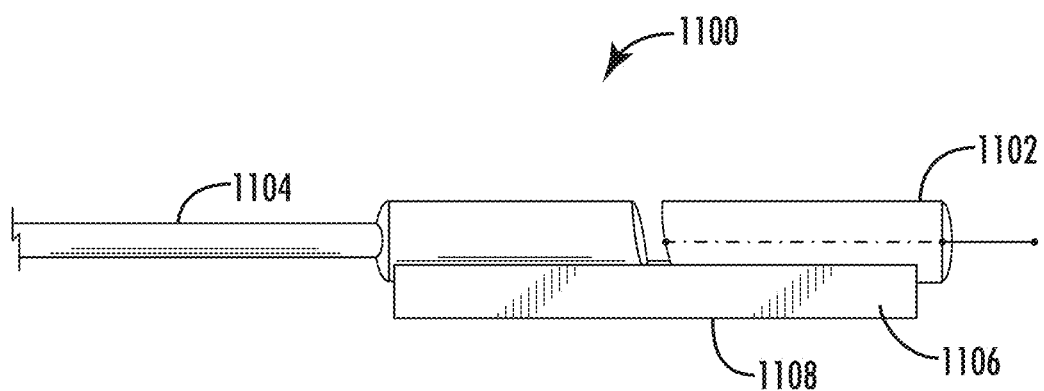
FIG. 11A is a perspective view of an example compact collimator for use with the components and devices of FIGS. 2-8.

FIG. 11A is a perspective view of an example compact collimator for use with the components and devices of FIGS. 2-8. A collimator 1100 includes a lens 1102 (e.g., a glass or silica collimating lens), a fiber pigtail 1104, and a groove (e.g., a generally V-shaped groove) formed in a base 1106. The lens 1102 and the fiber pigtail 1104 are disposed in the groove. The lens 1102 is configured to receive a light signal provided to the WDM multiplexer/demultiplexer from an external optical transmission system or provide a light signal multiplexed or demultiplexed by the WDM to an external optical transmission system. The lens 1102, for example, may be configured to receive a light signal from a fiber optic element for multiplexing or demultiplexing and/or to provide a multiplexed or demultiplexed light signal to an external fiber optic element. The fiber pigtail 1104 is optically coupled to the lens 1102 and is configured to provide a light signal to the lens 1102 from the external fiber optic element and/or to receive the light signal from the lens 1102 for transmission to the external fiber optic element.

In various embodiments, the lens 1102 and the fiber pigtail 1104 may or may not contact each other. The lens 1102 and the fiber pigtail 1104 may be securable to the groove independent of each other to allow for precise adjustment of a pointing angle between an optical beam from the collimator 1100 and a side and/or bottom surface of the groove. In addition, the lens 1102 and fiber pigtail 1104 may have the same outer diameter.

The base 1106 of the collimator 1100 has a generally flat bottom surface 1108 for mounting on a substrate of a WDM multiplexer/demultiplexer or other optical system. The base 1106 further includes a width that is less than a width of the lens 1102 and a width of the fiber pigtail 1104.

Figure 11B:
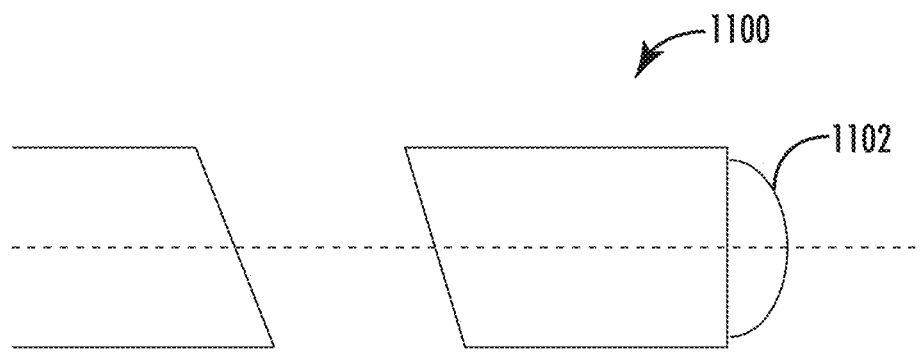
FIG. 11B is a side view of the compact collimator of FIG. 11A.

FIG. 11B is a close-up side view of the compact collimator of FIG. 11A. A pointing angle between an optical beam from a collimator 1100 and the side and bottom surface of the groove can be eliminated (or at least reduced) by controlling the relative position between the lens 1102 and the fiber pigtail 1104 of the collimator 1100. By fine tuning the position of the fiber pigtail 1104 to make an outgoing beam come across a focal point of the lens 1102, a collimated zero pointing angled beam with negligible off axis offset can be achieved. In one embodiment, for example, the tuning can be monitored by near field and far field beam position comparison (e.g., using a beam scanner). The zero pointing angle collimating components are easier to attach to the substrate with little inclination, and more reliable bonding is possible due to the uniform epoxy or bonding agent. It is noted that FIG. 11B is a schematic illustration used to illustrate concepts of the description and that the ends of the glass lens and the fiber pigtail 1104 may be oriented at other angles, including perpendicular, to the body of the glass lens and the fiber pigtail, respectively.

The structures of the collimator 1100 allow for easier modularization and remove redundant degrees of freedom versus designs in which a collimator is coupled and attached to the substrate via external wedges or supports. Thus, the collimator 1100 may reduce the complexity and further increase the device efficiency and process reliability of the overall multiplexer/demultiplexer design.

Figure 12A:
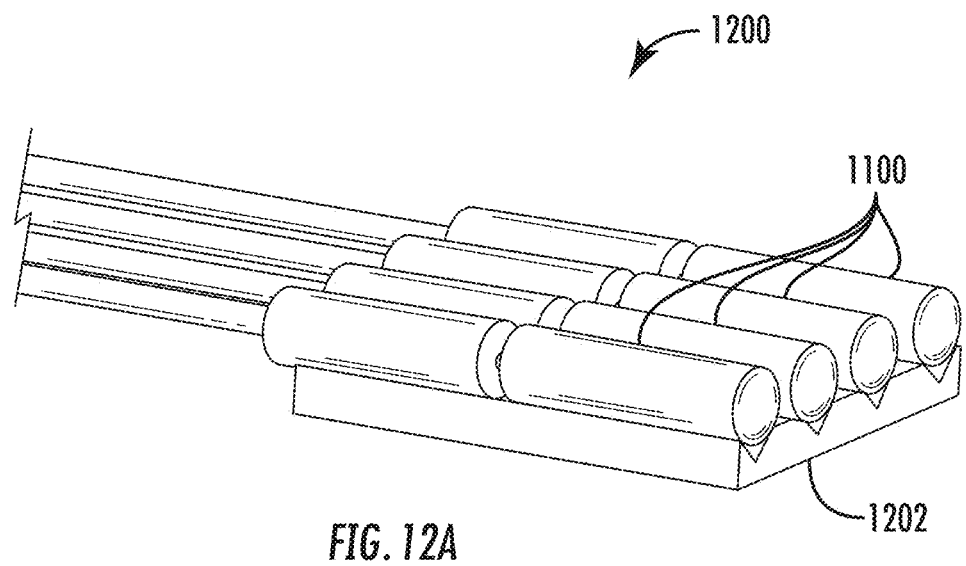
FIG. 12A is a perspective view of an example array of the compact collimators of FIGS. 11A-11B.
Figure 12B:
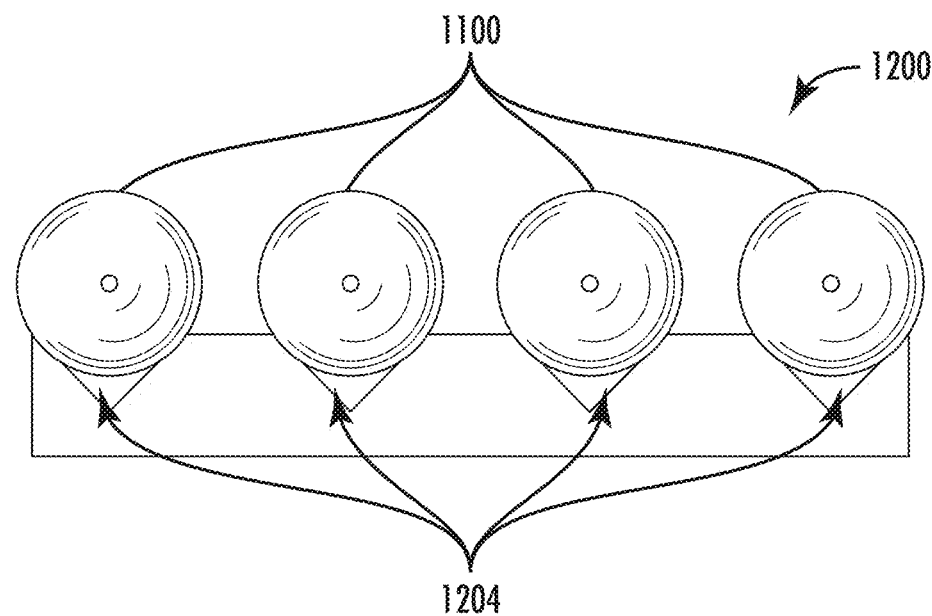
FIG. 12B is a close-up front view of the array of compact collimators of FIG. 12A.

FIGS. 12A-12B are views of an example array 1200 of the collimators 1100 of FIGS. 11A-11B. The collimators 1100 are arranged side-by-side on a surface of a substrate 1202, the substrate 1202 including a plurality of grooves 1204 (discussed above). The grooves 1204 could be v-grooves or any other type of groove. A spacing between the substrate 1202 of the side-by-side collimators 1100 is greater than a spacing between the lenses 1102 and fiber pigtails 1104 of the side-by-side collimators 1100.

Figure 13:
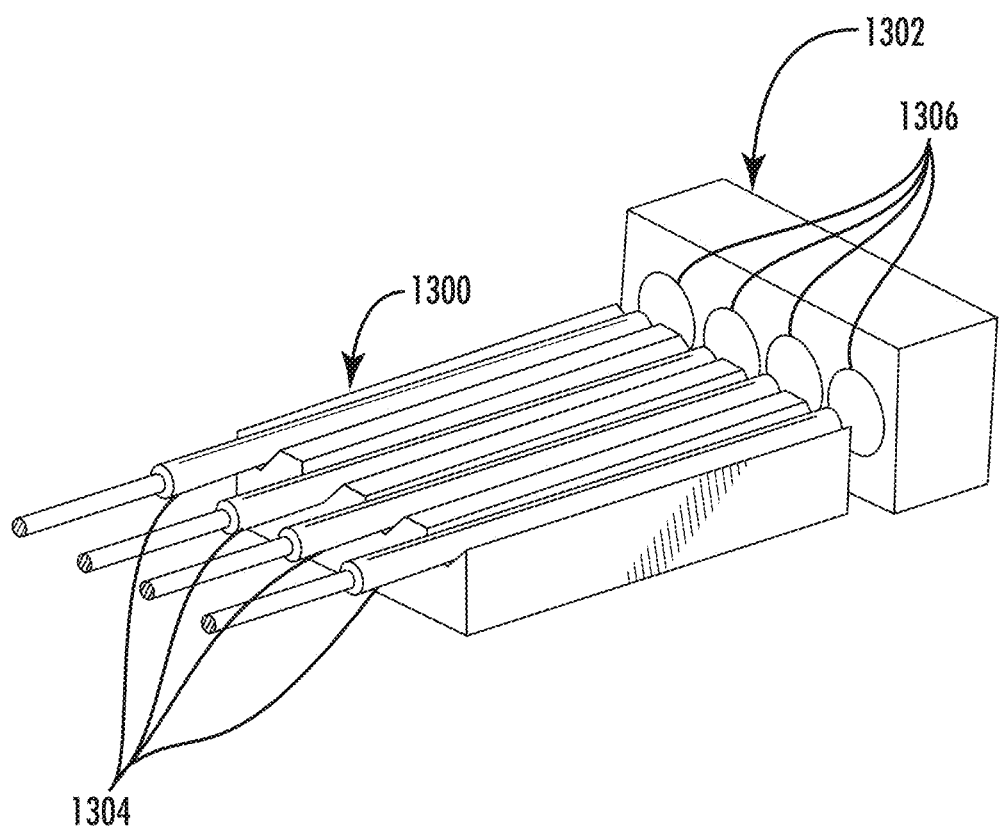
FIG. 13 is a perspective view of an example of a fiber array unit (FAU) and multi-lens array (MLA) for use with the components and devices of FIGS. 2-8.

FIG. 13 is a perspective view of an example of a fiber array unit (FAU) 1300 and a multi-lens array (MLA) 1302 for use with the components and devices of FIGS. 2-8. More specifically, the FAU 1300 includes a plurality of fibers 1304, and the MLA 1302 includes a plurality of lenses 1306. The FAU 1300 and MLA 1302 can be used with any of the embodiments discussed above.

It will be apparent to those skilled in the art that various modifications and variations can be made without departing from the spirit or scope of the invention.

Further, as used herein, it is intended that terms "fiber optic cables" and/or "optical fibers" include all types of single mode and multi-mode light waveguides, including one or more optical fibers that may be glass core, plastic core, upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Pat. No. 7,787,731 and U.S. Patent Application Publication No. 2009/0169163.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A wavelength-division multiplexing (WDM) device, comprising:
 a first common port configured for optical communication of a first multiplexed signal comprising a first primary demultiplexed signal, a second primary demultiplexed signal, a third primary demultiplexed signal, a fourth primary demultiplexed signal, and a fifth primary demultiplexed signal, the first primary demultiplexed signal comprising a first secondary demultiplexed signal within a first wavelength range and a second secondary demultiplexed signal within a second wavelength range, the first wavelength range and the second wavelength range separated from each other by the third wavelength range;
 a first channel port configured for optical communication of the first primary demultiplexed signal;

a second channel port configured for optical communication of the second primary demultiplexed signal;
a third channel port configured for optical communication of the third primary demultiplexed signal;
a fourth channel port configured for optical communication of the fourth primary demultiplexed signal;
a fifth channel port configured for optical communication of the fifth primary demultiplexed signal;
a first WDM filter having a first single unified passband comprising the first wavelength range, the second wavelength range, and the third wavelength range, the first WDM filter configured to pass the first secondary demultiplexed signal and the second secondary demultiplexed signal to the first channel port and to pass the second primary demultiplexed signal to the second channel port;
a second WDM filter having a second passband, the second WDM filter configured to pass the second primary demultiplexed signal to the second channel port;
a third WDM filter having a third passband, the third WDM filter configured to pass the third primary demultiplexed signal to the third channel port;
a fourth WDM filter having a fourth passband, the fourth WDM filter configured to pass the fourth primary demultiplexed signal to the fourth channel port; and
a fifth WDM filter having a fifth passband, the fifth WDM filter configured to pass the fifth primary demultiplexed signal to the fifth channel port;
wherein:
the first primary demultiplexed signal comprises a GPON signal;
the second primary demultiplexed signal comprises an XGS-PON signal;
the third primary demultiplexed signal comprises an NG-PON2 signal;
the fourth primary demultiplexed signal comprises a radio frequency (RF) signal; and
the fifth primary demultiplexed signal comprises an optical time-domain reflectometer (OTDR) signal.

2. The WDM device of claim 1, wherein the first common port comprises a first common collimator, the first channel port comprises a first channel collimator, and the second channel port comprises a second channel collimator.

3. A method for wavelength-division multiplexing (WDM) routing, comprising:
transmitting a first multiplexed signal from a first common port, the first multiplexed signal comprising a first primary demultiplexed signal and a second primary demultiplexed signal, the first primary demultiplexed signal comprising a first secondary demultiplexed signal within a first wavelength range and a second secondary demultiplexed signal within a second wavelength range, the first wavelength range and the second wavelength range separated from each other by a third wavelength range;
routing the first primary demultiplexed signal to a first channel port by passing the first secondary demultiplexed signal and the second secondary demultiplexed signal through a first WDM filter having a first single unified passband comprising the first wavelength range, the second wavelength range, and the third wavelength range;
routing the second primary demultiplexed signal to a second channel port by reflection of the first WDM filter;
routing the second primary demultiplexed signal of the first multiplexed signal to the second channel port by passing the second primary demultiplexed signal through a second WDM filter having a second passband;
routing a third primary demultiplexed signal of the first multiplexed signal to a third channel port by passing the third primary demultiplexed signal through a third WDM filter having a third passband; and
routing a fourth primary demultiplexed signal of the first multiplexed signal to a fourth channel port by passing the fourth primary demultiplexed signal through a fourth WDM filter having a fourth passband;
wherein:
the first primary demultiplexed signal comprises a GPON signal;
the second primary demultiplexed signal comprises an XGS-PON signal;
the third primary demultiplexed signal comprises an NG-PON2 signal;
the fourth primary demultiplexed signal comprises a radio frequency (RF) signal; and
the fifth primary demultiplexed signal comprises an optical time-domain reflectometer (OTDR) signal.

4. The method of any of claim 3, wherein the first common port comprises a first common collimator, the first channel port comprises a first channel collimator, and the second channel port comprises a second channel collimator.

5. A wavelength-division multiplexing (WDM) system, comprising:
a source, a first WDM device, a second WDM device and a destination in optical communication with the source via the first WDM device and the second WDM device;
wherein the first WDM device comprises:
a first common port configured for receiving a multiplexed signal from the source, wherein the multiplexed signal comprises a first primary demultiplexed signal and a second primary demultiplexed signal, the first primary demultiplexed signal comprising a first secondary demultiplexed signal within a first wavelength range and a second secondary demultiplexed signal within a second wavelength range, the first wavelength range and the second wavelength range separated from each other by a third wavelength range;
a first channel port configured for optical communication of the first primary demultiplexed signal;
a second channel port configured for optical communication of the second primary demultiplexed signal; and
a first WDM filter having a first single unified passband comprising the first wavelength range, the second wavelength range, and the third wavelength range, the first WDM filter configured to pass the first secondary demultiplexed signal and the second secondary demultiplexed signal to the first channel port and to pass the second primary demultiplexed signal to the second channel port; and
wherein the second WDM device comprises:
a second common port configured for receiving the first primary demultiplexed signal from the first channel port;
a third channel port configured for optical communication of the first secondary demultiplexed signal;
a fourth channel port configured for optical communication of the second secondary demultiplexed signal; and a second WDM filter having a second passband, the second WDM filter configured to pass the first secondary demultiplexed signal to the third channel port and the destination.

6. The WDM system of claim 5, wherein the first primary demultiplexed signal comprises a GPON signal.

7. The WDM system of claim 5, wherein the second primary demultiplexed signal comprises an XGS-PON signal.

8. The WDM system of claim 5, wherein the second primary demultiplexed signal comprises an NG-PON2 signal.

9. The WDM device of claim 5, wherein the first primary demultiplexed signal comprises a GPON signal, the second primary demultiplexed signal comprises either an XGS-PON signal or an NG-PON2 signal.

\* \* \* \* \*